United States Patent
Yaqub et al.

(10) Patent No.: US 12,513,230 B2
(45) Date of Patent: Dec. 30, 2025

(54) BLUETOOTH COMMUNICATION CIRCUITRY AND METHOD FOR USE THEREOF

(71) Applicant: Oswego Technologies LLC, Columbus, NJ (US)

(72) Inventors: Raziq Yaqub, Lumberton, NJ (US); Brian Gordaychik, Columbus, NJ (US)

( * ) Notice: Subject to any disclaimer, the term of this patent is extended or adjusted under 35 U.S.C. 154(b) by 0 days.

(21) Appl. No.: 19/207,465

(22) Filed: May 14, 2025

(65) Prior Publication Data
US 2025/0379925 A1 Dec. 11, 2025

Related U.S. Application Data

(60) Provisional application No. 63/676,366, filed on Jul. 27, 2024, provisional application No. 63/658,823, filed on Jun. 11, 2024.

(51) Int. Cl.
*H04L 69/22* (2022.01)
*H04L 9/40* (2022.01)
*H04L 27/18* (2006.01)

(52) U.S. Cl.
CPC .............. *H04L 69/22* (2013.01); *H04L 27/18* (2013.01); *H04L 63/0428* (2013.01)

(58) Field of Classification Search
CPC ......... H04L 69/22; H04L 43/02; H04L 69/04; H04L 63/0428
See application file for complete search history.

(56) References Cited

U.S. PATENT DOCUMENTS

| | | | |
|---|---|---|---|
| 7,505,433 B2 | 3/2009 | Yaqub |
| 8,023,580 B2 | 9/2011 | Bremer |
| 8,412,097 B2 | 4/2013 | Tao |
| 9,100,874 B2 | 8/2015 | Yaqub |
| 10,560,974 B2 | 2/2020 | Song |
| 10,880,895 B2 | 12/2020 | Gordaychik |
| 11,729,612 B2 | 8/2023 | Luo |

(Continued)

FOREIGN PATENT DOCUMENTS

WO WO-2020261181 A1 * 12/2020 ............. H04L 12/66

OTHER PUBLICATIONS

Ma et al., "Secure Communication in TDS-OFDM System Using Constellation Rotation and Noise Insertion," IEEE Transactions on Consumer Electronics, vol. 56, No. 3, Aug. 2010.

(Continued)

*Primary Examiner* — Esther B. Henderson

(57) ABSTRACT

An IC may comprise circuitry configured to process a first PDU having a first header portion comprising a first set of flags that specify whether the first header portion includes first clock information, first synchronization information and a first address. The IC may further comprise circuitry configured to process a second PDU having a second header portion and encryption information, wherein the second header portion comprises a second set of flags which are configured differently than the first set of flags. Data may be processed based on the encryption information, and for example, the IC may perform secondary processing based on the data. The IC may further comprise circuitry configured to perform at least one capability check with another device by employing a single coded capability identifier representing a plurality of supported features.

20 Claims, 4 Drawing Sheets

(56) References Cited

U.S. PATENT DOCUMENTS 11,765,710 B2      9/2023  Rudolf
2023/0199613 A1*   6/2023  Jung ................... H04W 40/248
                                                          370/329

OTHER PUBLICATIONS

Muhammad Zaid Hameed et al., "The Best Defense Is a Good Offense: Adversarial Attacks to Avoid Modulation Detection," 7th IEEE Global Conference on Signal and Information Processing (GlobalSIP 2019).
Bluetooth Special Interest Group, Bluetooth Core Specification v6.0, Aug. 27, 2024, pp. 1, 1626-1634, 2876-2880, 2949-2966, 2991, 3009-3010, 3135-3153, 3164 and 3759-3767, available online at https://www.bluetooth.com/specifications/specs/.
Bluetooth Special Interest Group, Bluetooth Core Specification v5.4, Feb. 7, 2023, pp. 2704-2724, available online at https://www.bluetooth.com/specifications/specs/.

* cited by examiner

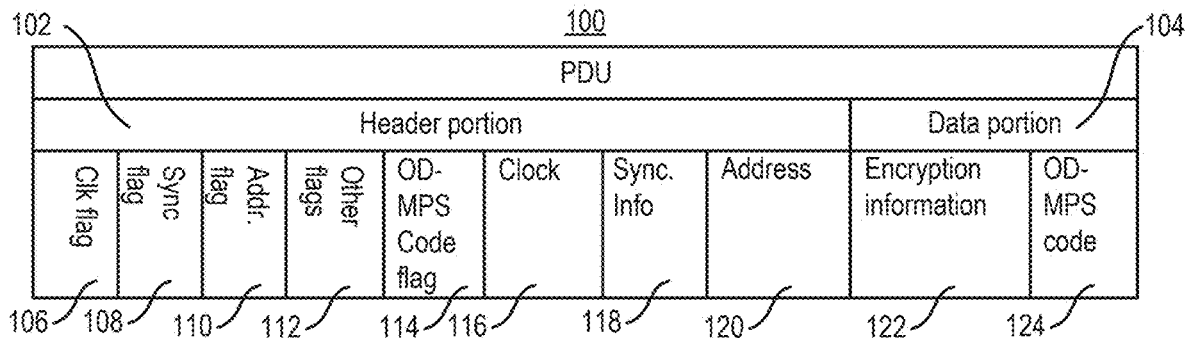
FIG. 1
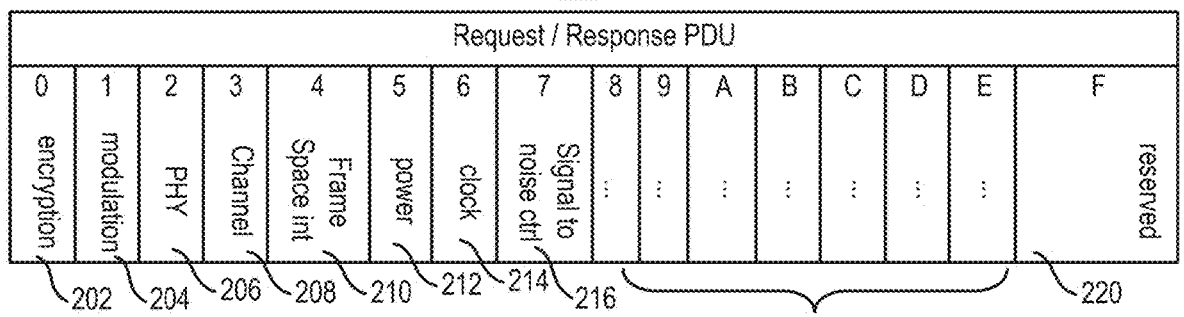
FIG. 2
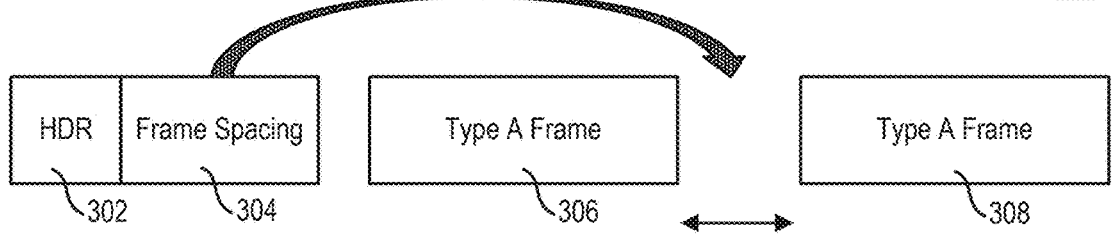
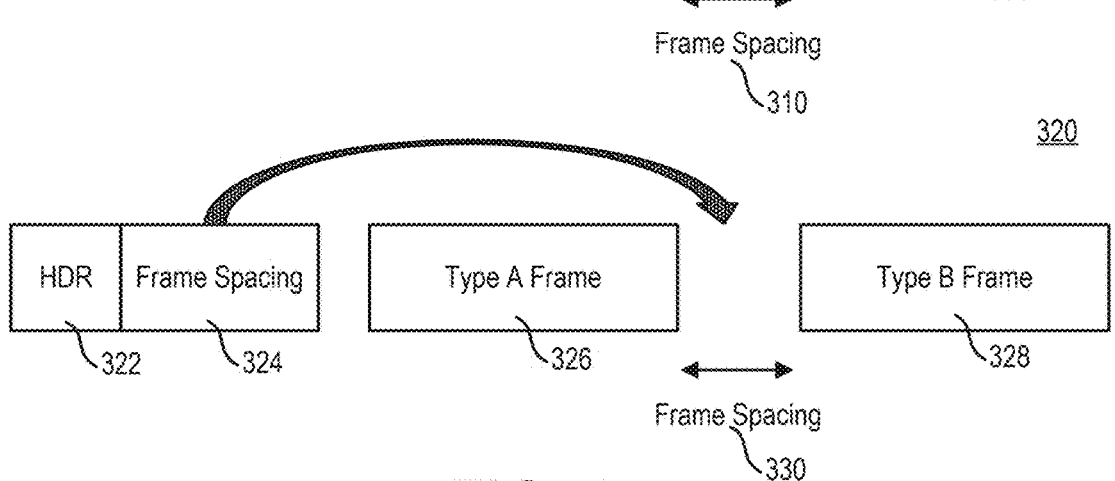
FIG. 3

400

| | | |
|---|---|---|
| 402 | Structure of OD-MPS Code<br>The structure of the OD-MPS Code may comprise several segments to convey specific information to the network. This code may be generated through supervisory control and data acquisition (SCADA) using multiple sensors installed in the autonomous machine. | |
| 404 | Emergency Type Code Segment (ETCS) | This segment indicates the type of emergency, such as collision, fire, or water ingress. |
| 406 | Impact Data Code Segment (IDCS) | This segment provides information about the impact force and the precise location of the impact, which is useful for assessing the severity of the incident. |
| 408 | Environnemental Data Code Segment (EDCS) | This segment contains data on environmental conditions, such as smoke detection, water ingress levels, or the presence of hazardous gases. |
| 410 | Safety-mechanism Activation Code Segment (SACS) | This segment indicates the activation of safety mechanisms, such as airbag deployment in vehicles |
| 412 | Machine Identification Code Segment (MICS) | This segment is a unique identifier for the autonomous machine, ensuring accurate tracking and management. |
| 414 | GPS Coordinates Code Segment (GCCS) | This segment provides real-time geographical location data to facilitate rapid response and assistance |
| 416 | Regulatory Information Code Segment (RICS) | This segment includes any other information required by regulatory authorities to ensure a comprehensive emergency response, compliance, or any other necessary details. |
| 418 | Capability identification | This segment may identify a capability of any portion of a device and/or may specify identification or version information of the OD-MPS Code. |
| 420 | Coding specification information | This segment may specify how the OD-MPS Code is coded for used by a decoder. |
| 422 | Public key or shared key data | There may be a public key portion included so as to protect communication that follows. |
| 424 | Randomly generated information | This segment may contain a nonce to avoid replay attacks or other types of security attacks. |
| 426 | Length and/or number of fields | This segment may specify a length of a variable length OD-MPS code. may indicate whether one or more fields are present/absent, and/or may indicate a number of fields included in the OD-MPS code. |
| | Cyclic redundancy check | There may be a CRC appended in some cases. |

FIG. 4

BLUETOOTH COMMUNICATION CIRCUITRY AND METHOD FOR USE THEREOF

CROSS REFERENCE TO RELATED APPLICATIONS

This application claims the benefit of U.S. Provisional Patent Application No. 63/658,823 filed on Jun. 11, 2024 and U.S. Provisional Patent Application No. 63/676,366 filed on Jul. 27, 2024, the contents of each of which are incorporated by reference herein.

SUMMARY

An integrated circuit (IC) may comprise circuitry configured to process a first protocol data unit (PDU) having a first header portion comprising a first set of flags that specify whether the first header portion includes first clock information, first synchronization information and a first address. The IC may further comprise circuitry configured to process a second PDU having a second header portion and encryption information, wherein the second header portion comprises a second set of flags which are configured differently than the first set of flags. Data may be processed based on the encryption information, and for example, the IC may perform secondary processing based on the data. The IC may further comprise circuitry configured to perform at least one capability check with another device by employing a single coded capability identifier representing a plurality of supported features.

In embodiments, a third PDU may be processed in accordance with the capability check, wherein the third PDU specifies a frame space value, a type value and a physical layer (PHY) parameter. The PHY parameter may indicate physical layer information including modulation information. Such modulation information may correspond to another modulation than is employed by the first PDU and the second PDU. A fourth PDU may be processed in response to the third PDU.

In embodiments, the IC may comprise circuitry configured to, based at least in part on the response, transmit a modulated signal in accordance with an intentional injection of noise; and the circuitry may be further configured to, based at least in part on the response, perform a time-based position measurement in accordance with the modulated signal. In embodiments, the first PDU and the second PDU employ a same or different modulation.

BRIEF DESCRIPTION OF THE DRAWINGS

FIG. 1 shows an example PDU having a header portion and a data portion;
FIG. 2 demonstrates an example capability request/response PDU;
FIG. 3 demonstrates a frame space adjustment procedure;
FIG. 4 demonstrates an on demand multimedia priority service (OD-MPS) code having various segments described.

DETAILED DESCRIPTION OF THE DRAWINGS

Figure 5:
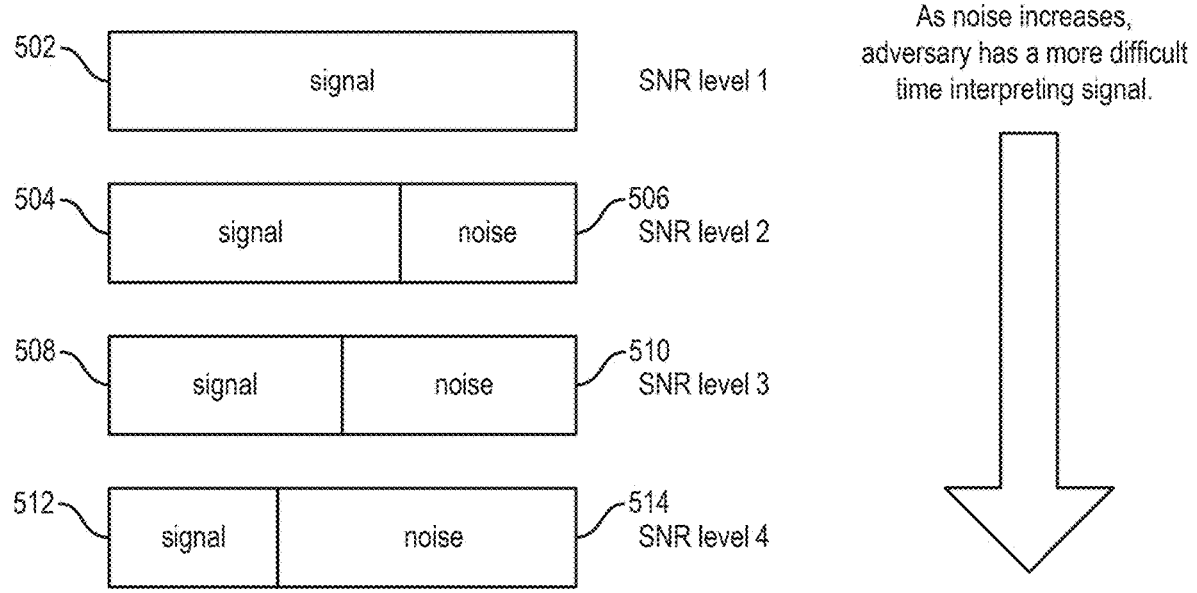
FIG. 5 illustrates cascading signal to noise levels.

An On-Demand Multimedia Priority Service (OD-MPS) is a service to address communication requirements empowering autonomous and semi-autonomous machines to independently solicit prioritized communication and perform negotiation and capability signaling. This facilitates swift transmission of real-time multimedia data (among other data) on a priority basis.

The proposed system and protocols may utilize Quality of Service (QOS) mechanisms like traffic prioritization and congestion control to ensure efficient delivery of priority traffic with minimal delay, jitter, or packet loss. This is particularly important for applications that require real-time or near-real-time transmission, such as voice and video calls, streaming media, etc.

The proposed system may be securely integrated with a communication bus, e.g. a vehicle internal communication system bus, such as Lin Bus, Can Bus, or any wired or wireless communication system, such as Wi-Fi, Bluetooth or Cellular communication systems.

In embodiments herein, device-to-device (D2D) transmission may be used for direct communication between UEs. Bluetooth, for example, is a personal area networking standard for communication between devices. Bluetooth has evolved over time to support different modulation techniques, faster speeds, lower power use, more reliable connections and to support different access methods and topologies. The first versions of Bluetooth, e.g. versions 1.0 and 1.1 circa ~1999-2001 had basic wireless connectivity but were slow, were sometimes unstable and had cumbersome security features. Bluetooth 2.0 introduced enhanced data rate (EDR) in 2004 which increased speeds by changing a basic rate modulation to an enhanced rate modulation. Bluetooth 3.0+HS ~2009 added high speed (HS) support using Wi-Fi for transfers. Bluetooth 3.0 has seen limited adoption. Bluetooth 4.0 introduced Bluetooth Low Energy (BLE) in 2010 which enabled wearables and sensors. Bluetooth 4.1/4.2 circa ~2013-2014 improved coexistence with LTE and again increased data throughput. Bluetooth 5.0 and onward came with further increases in speed and range as well as enabled direction finding and positioning and better audio support. In each iteration, power efficiency, connection reliability and simplified pairing became enhanced.

Bluetooth 5.4 describes PDUs which may be transmitted only on primary advertising channels, and those PDUs may be linked, by way of a pointer field called AuxPtr, to PDUs that are transmitted only on secondary advertising channels, i.e. channels other than the primary advertising channels. One downside to Bluetooth 5.4 is that the PDUs transmitted on the primary advertising channels fail to include cryptographic information which may be used by a receiver to make a decision as to whether such secondary PDUs are relevant to the receiver.

Presently pending claim 1, for example, is directed to the inclusion of cryptographic information in a PDU such that the encryption information may be used as a basis for obtaining information on a secondary channel. By including cryptographic information and potentially reducing a quantity of data included in a header portion, transmission efficiencies may be effectuated. Exemplary cryptographic information includes a combined code, e.g. an OD-MPS code, which jointly indicates shared key data and identification information, so as to uniquely identify a device.

A shared key may be established at one side (e.g. one device side) and may be established another side additionally, by way of reference signaling, for example. In embodiments, a combination of two keys may result in a shared key which may then be used for cryptographic purposes, including to protect the channel. A length of a shared key (which may be made up of two different size keys) may be based on UE capability, or the like. For example, prior art Bluetooth tributaries, for example, do not utilize shared keys in certain embodiments as disclosed herein.

Shared keys may be derived in accordance with random functions. In embodiments, random functions may be derived based on a previously selected identifier, e.g. in embodiments, a random number may be an input to a next randomly generated number, for example, for securing a wireless channel between two devices.

Bluetooth frame formats and signaling procedures (among other types of frame formats and signaling procedures) are further enhanced herein. For instance, embodiments disclosed herein address various improvements in packet protocol formats, including protocol formats that have one or more header and data portions included in protocol data units (PDUs). A PDU header portion may comprise flags, e.g. binary indicators, that indicate contents (or a lack thereof) in the PDU. In examples, a header may comprise flags indicating whether the header field comprises such fields including a clock indicator, synchronization information and an address.

For example, frames may address devices by way of a group address in a header field or payload field of the message, such that devices are grouped according to capability or protocol implementation.

Including such fields (as described above) in a header portion may simplify decoding of the remaining elements such that the decoding may be performed earlier in the PDU and/or such that transmission time may be shortened. If such components are not included in the PDU, as per the flags, then a receiver may configure receive circuitry accordingly. It may also be such that a receiver may not support such features and may stop decoding certain indicated portions after receiving the flags.

FIG. 1 shows an example PDU 100 having a header portion 102 and a data portion 104. The header portion 102 comprises plurality of flags, e.g. a clock flag 106, sync flag 108, an address flag 110, other flags 112 and an OD-MPS code flag 114. Each flag specifies whether clock information 116, synchronization information 118 and address information 120 are included in the PDU. Encryption information 122 and/or an OD-MPS code 124 may be optionally included along with other data. It should be noted that the OD-MPS code 124 may itself comprise encryption information and therefore may substitute or may be included along with any other encryption information (which may alternatively be in the header portion).

An on-demand code may be included in any portion of a PDU, for example, included in the data portion. Such code may or may not be included in other portions of other PDUs. The term on-demand may refer to the ability of a code to present itself in some instances, but not other instances, e.g. an ability for a particular frame to incorporate the code, while other frames may not incorporate the code.

In embodiments, data packets may have a header portion, a payload portion and a trailer portion. Any of the fields specified therein may be fixed or variable in length with a portion (header, payload or trailer portion) indicating a length. The header portion may comprise a length field (e.g. chips), a modulation field indicative of a modulation used for a subset of the header portion and/or modulation used for a field which follows the header portion.

In embodiments, a modulation method and/or modulation speed may change according to fields specified in the header portion or elsewhere. Each field of the packet may have a fixed or variable length and thus the length may be decodable via a field in the header or other portion of the packet. The length may specify a number of timing units and/or number of bits/bytes etc.

Each field of the packet may have a fixed or variable length and thus the length may be decodable via a field in the header or other portion of the packet. The length may specify a number of timing units and/or number of bits/bytes etc. In embodiments, a header field may comprise a sequence number, data unit indicator, there may be one or more flags set based on the present/absence of any field herein within any portion of the packet. Header portions may include encryption information for remaining fields of the packet. There may also be forward error correction (FEC) parameters and cyclic redundancy check (CRC) parameters included. For instance, a CRC may be based on an encrypted protocol or a non-encrypted protocol. Header portions may include information on energy harvesting parameters, clock synchronization (rising edge or falling edge may be specified), backscatter parameters, reflection amplification, cyclic prefix, line code type switch parameters, band size of payload (for packets with larger frequency domain payload sizes than in header), scrambling, synchronization type for payload portion, number of chips used for OOK, bit sequence for mapping between bits to line code words, time domain specification in chips, frequency domain definition in terms of OFDM symbols, whether symbols are allocated in order or whether puncturing is applied on certain symbols, resource unit allocations and the like.

Transmissions may be performed in a distributed fashion, for example, transmission may be made on subcarriers across one or more bandwidth allocations. In some embodiments, transmission resources may span multiple carriers with interspersed frequency portions not transmitted on due to detected busy or via sensing methods. This may apply to various transmission methodologies and/or topologies, including, for example, Wi-Fi direct and Bluetooth technologies.

In some embodiments FEC type may be specified or implied based on a transmission type or packet format. Header formats may specify CRC type, e.g. what polynomial is assumed for CRC generation and where the CRC is located in a packet. This may also be based on packet type/transmission type/topology. Header formats may specify packet type which is correlated with a frequency domain size allocation, e.g. a bandwidth and also associated with a packet length.

In embodiments, a smaller size bandwidth data packet (e.g. the frequency component) may be longer in size as compared to a data packet which occupies less frequency spectrum. The converse of this may also be true. For example, a transmitter may transmit a first packet having a bandwidth larger than a second transmitted packet despite the second packet being shorter in length than the first packet. Packets may be modulated differently, even though there may be more information potential, and thus packets may have a same information size.

In embodiments, integrated circuits resident in devices may be used to perform one or more capability checks with another device, for example, by exchanging a request/response with the another device. A capability request and response may comprise a single coded capability identifier which may represent a plurality of supported features. For example, some devices may support a frame space timing adjustment capability, whereby devices may negotiate timing of spacing between frame portions. Same or other devices may support a phase tracking capability and/or a pathloss calculation capability, depending on supported mode of operation. In some modes, for example, devices may be capable of asynchronous or isochronous communication, support all or only a subset of available of RF channels, connectionless or connection oriented and may be either configurable for one or both of bidirectional or unidirectional communication.

In embodiments, capability information may be joint coded into a single coded capability identifier (for example, a binary string of bits segmented according to parameter).

Wireless devices may perform capability checks with receiving devices by reporting support for any capability parameter disclosed herein and additionally by requesting information on capability of a remote device. A capability check may be referred to as a request/response capability check. In embodiments, a request and response may be provided to a device located outside of a cellular network, in embodiments disclosed herein. For instance, the request/response may be performed by devices which may or may not have access to a cellular network.

In embodiments, UEs may report a capability of hardware form or structure to network devices and vice versa. UEs may report an ability to evaluate a channel in terms of a timing ability or an offset ability based on receive signal to channel reporting time and they may report power parameters.

FIG. 2 demonstrates an example capability request/response PDU 200. In this example, a number of flags may be set to indicate capabilities of a transmitting device. For instance, the capabilities may include a capability related to encryption 202, modulation 204, PHY 206, channel 208, frame space interval configuration 210, power 212, clock, SNR control 216 among others 218. There may be room left, e.g. reserved 220, for other capabilities as such capabilities become standardized. Such PDU 200 may be transmitted first by one device and then received in response to the transmission. The combination of capability flags (denoted by each device) may be ANDed such that the joint capabilities include only those capabilities which are common among the pair of communication devices.

UEs may be determined based on a classification (for example, class A comprises switching antennas; class B comprises Fluid antennas; class C comprises moving antennas; class D comprises parasitic antennas; class E comprises a combination of any one or more of class A, B, C or D). Descriptions of each one of these antenna types are provided by "Flexible-Position MIMO for Wireless Communications: Fundamentals, challenges, and Future Directions" by Zheng et al. which is disclosed herein in its entirety.

UEs may report a capability of a number of microseconds to switch antennas. In this way, a base station may indicate to a UE how and when to form directional beams, adjust beamforming weights, and steer the antenna radiation pattern in desired directions. In some embodiments, a user equipment device may simultaneously alter or modulate the amplitude, phase and/or frequency of an incident beam in order to perform beam steering.

Device to device communication, including vehicle to vehicle communication, for example, may employ one or more fallback modes in cases where connections cannot be established or maintained. For example, support for a given set of protocols may be provided by way of a first D2D technology, including Wi-Fi Direct (or via LTE or NR protocols) from one vehicle to another. Depending on the protocol used to indicate support, the vehicles may establish a connection using a speed or modulation method supported by the protocol which is either higher or lower than the one used to report capability. In embodiments, the communication may switch to another supported communication method disclosed herein.

Devices may have frame format capabilities. For instance, certain frame formats, for example, PDU frame formats, may be transmitted one directly after another or with a brief interval in-between. A first PDU may specify a timing, for example, a short interframe space (SIFS) (or more or less time), in-between another PDU of a same or different format which is to be transmitted from a STA to another STA.

In embodiments, a device may transmit a data frame to another device which indicates resources for a subsequent data frame transmitted by the device to the another device. The resource indicating may include a frequency, beam or time indication and may specify an offset in time between a first and second transmitted frame. Frames transmitted by the another device may be the same or different type of frame and may or may not contain allocation information, ACK information, a new group ID, etc. The device may send an ACK to the another device all before the duration expires.

FIG. 3 demonstrates frame space adjustment 300. For instance, a frame may indicate a timing between two frames 306, 308 which follow, e.g. a frame space interval 310. A frame may have a header portion 302 and a data portion 304 which may specify a frame space interval 310 for use between two frames 306, 308 of a first modulation scheme, e.g. a type A frame.

In another instance 320, a frame having a header portion 322 and a data portion 324 may indicate a same or different timing 330 between two frames 326, 328, e.g. a frame space interval 330. A type B frame may be of a different modulation format than a type A frame and therefore frame spacings intervals maybe configured differently according to modulation type.

In embodiments, frames may utilize one or more modulation types in a single frame, e.g. frequency shift keying may be used in conjunction with phase shift keying.

Devices may be configured to wirelessly process a set of frames used to configure the frame spacing. For example, a third PDU may be used to specify a frame space value and other physical layer information. For instance, the third PDU may comprise a type value and a physical layer (PHY) parameter including or indicating modulation information. A fourth PDU may be processed in response. Additionally, another frame space value different than the frame space value may be provided. In embodiments, a frame space value may be selected to be greater than another configurable frame space value.

A second PDU may be transmitted to the same device or to another device. The first PDU may provide other information, for example, a modulation of the second PDU, a type of PDU, whether the second PDU is on a same or different channel, etc.

Any parameter disclosed herein, including an OD-MPS code, may be included in a first PDU to signal information about the second PDU. A same approach may be used for other technologies, including wired technologies. In embodiments and depending on capability, a receiver may confirm safe receipt of one PDU and not another PDU. If there is a collision of the first or second PDU, the receiver may indicate such to the transmitter.

FIG. 4 demonstrates an OD-MPS code 400 which may comprise any one or more of the following described segments. Emergency Type Code Segment (ETCS) 402: This segment indicates the type of emergency, such as collision, fire, or water ingress. Impact Data Code Segment (IDCS) 404: This segment provides information about the impact force and the precise location of the impact, which is useful for assessing the severity of the incident. Environmental Data Code Segment (EDCS) 406: This segment contains data on environmental conditions, such as smoke detection, water ingress levels, or the presence of hazardous gases. Safety-mechanism Activation Code Segment (SACS) 408: This segment indicates the activation of safety mechanisms, such as airbag deployment in vehicles. Machine Identification Code Segment (MICS) 410: This segment is a unique identifier for the autonomous machine, ensuring accurate tracking and management. GPS Coordinates Code Segment (GCCS) 412: This segment provides real-time geographical location data to facilitate rapid response and assistance. Regulatory Information Code Segment (RICS) 414: This segment includes any other information required by regulatory authorities to ensure a comprehensive emergency response, compliance, or any other necessary details. Capability identification 416: This segment may identify a capability of any portion of a device and/or may specify identification or version information of the OD-MPS Code. Coding specification information 418: This segment may specify how the OD-MPS Code is coded for used by a decoder. Public key or shared key data 420: There may be a public key portion included so as to protect communication that follows. Randomly generated information 422: This segment may contain a nonce to avoid replay attacks or other types of security attacks. Length and/or number of fields 424: This segment may specify a length of a variable length OD-MPS code, may indicate whether one or more fields are present/absent, and/or may indicate a number of fields included in the OD-MPS code. Cyclic redundancy check 426: There may be a CRC appended in some cases. Any other parameter disclosed herein may be included as a segment.

An OD-MPS code may be used ensure that communication is established as instantly as possible, enabling timely intervention and support, thereby enhancing safety and operational efficiency. An OD-MPS code may be transmitted/modulated according to any transmission/modulation scheme disclosed herein.

One or more devices may determine to transmit a modulated signal, comprising control information and/or data and while transmitting the modulated signal, a signal to noise ratio level may be varied via the injection of noise so as to thwart a potential adversary. In embodiments, devices may transmit modulated signal(s) to base stations and other devices which are not stationary.

A UE or base station may determine to use a shared key approach as opposed to another approach, for example, a noise injection approach, by predicting an adversary's noise channel conditions based on sensing of the environmental conditions, based on how strong one or more beams are to a legitimate receiver compared to a potential adversary. For instance, if beams to a legitimate receiver are far superior to beams receivable by a potential adversary, then a keying approach may be employed. In other instances, or in combination, a device may select a noise injection approach.

Bluetooth and other unlicensed band devices may make positioning measurements (e.g. Reference Signal Time Difference (RSTD) measurements or Observed Time Different of Arrival (OTDOA) measurements) and/or reference signal measurements (for instance discovery reference signal measurements). A device may perform measurements of such frequencies, i.e. frequencies which are unlicensed and potentially in used by different technologies or topologies. It may be that other devices are using such frequencies and there may be a need to both avoid certain frequencies and to employ adaptive modulation techniques so as to improve throughput.

Adaptive modulation techniques may be employed by both wired and wireless devices. Transmitters may actively manipulate inherent noise in a wireless system, for example, channel delay and doppler spread, in an effort to communicate data more quickly and securely. Devices may use OFDM in combination with other modulation techniques, for example, by using OFDM in environments with certain noise constraints and other OFDM schemes in other environments, for example, based on a noise threshold. Alternatives to OFDM include orthogonal time frequency space (OTFS), orthogonal delay-Doppler modulation (ODDM), vector OFDM and delay doppler alignment modulation (DDAM).

Example modulation methods include On-Off Keying (OOK) and Phase Shift Keying, e.g. Quadrature Phase Shift Keying (QPSK), among others or Frequency Shift On-Off Keying (UFSOOK) or any other form of frequency shift keying. Any scheme may by hybrid in nature and employ a combination of two or more schemes. For example, a single packet, frame PPDU, or the like may employ multiple (for example, 2-3) modulation methods wherein data a first modulation method is a lower speed/coding than a following modulation method. The second (or third) portion may be sent with a higher or lower power or at a different beam or angle, etc. Each of one or more modulation methods selected may be applicable in different instances, e.g. in instances wherein differing SNRs are present.

In examples, devices may negotiate a capability/procedure for exchanging data units having a certain SNR level. When a particular SNR level is selected, an adversary may have a more difficult time detecting signal, however, a trade off may be made for latency concerns as it may take more time to transmit a given signal if the signal incorporates added noise.

FIG. 5 illustrates cascading signal to noise levels 500. For instance, in an embodiment, a transmitter may simply transmit a signal 502 having no noise. In another scenario, the transmitter may transmit a signal 504 having roughly 30% noise 506. In another scenario, a transmitter may transmit a signal 508 having roughly 50% noise. In yet another scenario, a transmitter may transmit a signal 512 having roughly 60% noise 514. As noise increases, an adversary may have a more difficult time interpreting the signal and inferring information about communication among legitimate devices. This type of procedure may be performed in all modes of communication described herein, e.g. in device-to-device communication, device to base station communication, satellite communication, during measurement or positioning procedures, during synchronization, during reception of an OD-MPS, and the like. It may be that SNR injection may vary among different modulation formats, including during frame formats which employ multiple modulation techniques.

In embodiments, a modulated signal may be a component of a frame having a fixed or variable length frame format. Such frame format may always comprise a header portion and a trailer portion. In some cases, however, the frame format may be used to provide another portion, e.g. a random portion. In embodiments, other portions may be of fixed lengths, e.g. a trailer portion may be a fixed length.

OD-MPS access may be via satellite, irrespective of whether an OD-MPS compatible device has satellite subscription access. Alternatively, or in combination, an OD-MPS compatible device may have dual or multiple programmed SIMs, one SIM for OD-MPS functionality and another for regular internet access. A UE may transmit to a base station via Bluetooth, Wi-Fi, cellular etc. An 802.11be compliant Wi-Fi device may have multiple APs and/or multiple STAs integrated into one physical device. Such a device may have different operating modes for each STA or AP. For example, one STA may be an OD-MPS device and may formulate an OD-MPS code, while another STA may not have such a capability. Alternatively, or in combination, each STA may formulate a portion of a code, convey that portion to the other STA, via shared memory or via out of band signaling, and either STA or both STAs may each transmit all or a portion of the combined code. The term STA and UE may be used interchangeably herein. A UE or base station may request another UE to formulate an OD-MPS code, based on certain trigger criteria, for example, via sending an event, based on a timer or expiration thereof, based on other parameters received, etc.

PDUs may be transmitted, from device to device, and sometimes may be periodically transmitted. In embodiments, a device may report information on Bluetooth frequency/time/beam resources that are occupied or scheduled for its own Bluetooth transmissions. Alternatively, or in combination, a device may monitor the Bluetooth band and determine a transmission schedule that could potentially conflict with resource scheduling of the access point. For example, a device may decode a preamble, access address, error correction information, read a PDU header, CRC or the like. PDUs may indicate modulation scheme in a preamble.

In Bluetooth modes, in particular, interference avoidance schemes may be based on frequency hopping schemes in combination with puncturing schemes in the time/frequency domain. Interference schemes may be supported by certain priority levels and not supported by other data priority levels. For example, based on a transmission or reception priority, there may be packet dropping, rescheduling, channel puncturing, etc. or other techniques may be applied. Different interference schemes may be determined based on a symbol rate of the interfering transmissions.

Figure 6:
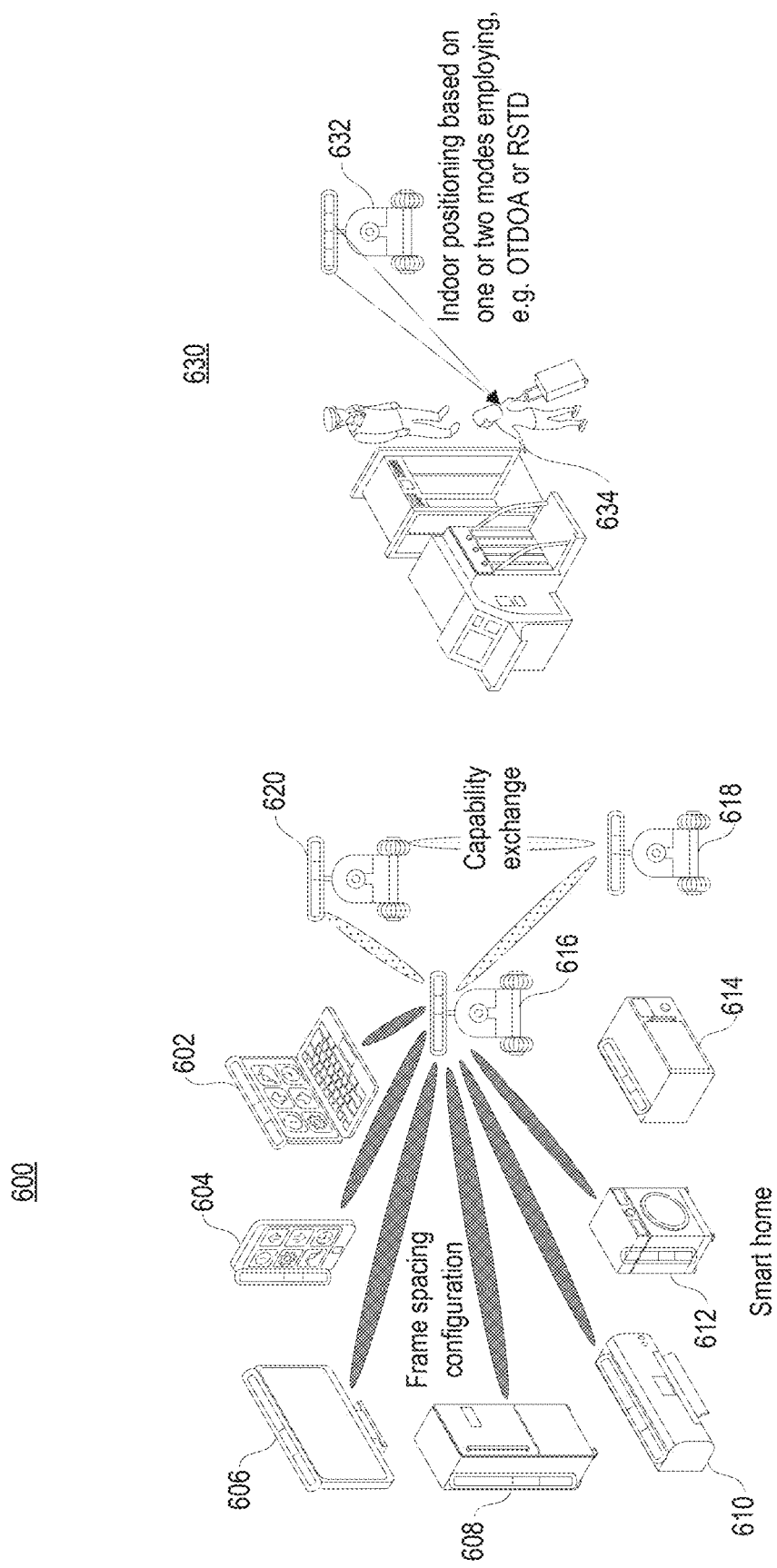
FIG. 6 is a diagram illustrating example use cases, including device to device communication and positioning scenarios.

FIG. 6 is a diagram illustrating example use cases 600, 630, including device to device communication and positioning scenarios. For example, an autonomous or semi-autonomous device, e.g. a robot 616 may perform a capability exchange with robots 618, 620 to exchange capability information as is described previously herein. Robot 616 may perform a frame space configuration procedure with a laptop 602, mobile phone 604, display device 606 and/or with smart home devices including a refrigerator 608, air conditioning unit 610, washing machine 612 and/or a microwave 614. In all embodiments, Bluetooth is the preferred method.

Similarly, indoor positioning 630 where precise position control may be required, positioning procedures may be performed between devices, e.g. a robot 632 and a cell phone located in a pocket or luggage of a traveler 634. In embodiments, flexible antennas may be used to perform the procedures described in FIG. 6. For more details on flexible antennas, and example configurations described by FIG. 6, see "Flexible-Position MIMO for Wireless Communications: Fundamentals, challenges, and Future Directions" by Zheng et al. ("Zheng") reproduced herein (i.e. incorporated herein) by reference in its entirety, which recites that "many scatterers, such as walls and furnishings, can cause significant multipath propagation, leading to deep channel fading, while at the same time acting as barriers that can block the direct path of the signal" and "a large number of electronic devices typically found in modern indoor areas often produce significant RF pollution, making the process of signal transmission even more challenging".

Robots and other autonomous devices, including devices shown in FIG. 6 may employ switching antennas that offer flexibility in beamforming and steering capabilities. Additionally, antennas can be integrated with easily controllable mobile devices like robots and drones, as well as with more challenging devices such as satellites and buoys to enhance significantly their communication range and operational efficiency. See Zheng for more information.

Positioning detection as shown in FIG. 6, for example, may be performed based on reported capability to detect objects based on type, e.g. using a reflection based method.

Although the features and elements disclosed are described in the embodiments in particular combinations, each feature or element can be used alone without the other features and elements of the embodiments or in various combinations with or without other features and elements of the present disclosure. The methods or flow charts provided may be implemented in a computer program, software, or firmware tangibly embodied in a computer-readable storage medium for execution by a general-purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. An integrated circuit (IC) comprising:
    circuitry configured to process a first protocol data unit (PDU) having a first header portion comprising a first set of flags that specify whether the first header portion includes clock information, synchronization information and an address;
    circuitry configured to process a second PDU having a second header portion and encryption information, wherein the second header portion comprises a second set of flags which are configured differently than the first set of flags;
    circuitry configured to process data, based on the encryption information;

circuitry configured to perform at least one capability check with another device, wherein a coded capability identifier representative of a plurality of supported features is processed by the IC, wherein the coded capability identifier indicates encryption support, modulation support and support for a frame space timing capability;

circuitry configured to process a third PDU, in accordance with the capability check, wherein the third PDU specifies a frame space value, a type value and a physical layer (PHY) parameter, wherein the PHY parameter indicates physical layer information including modulation information, wherein the modulation information corresponds to another modulation than which is employed by the first PDU and the modulation information corresponds to another modulation than which is employed by the second PDU;

circuitry configured to process a fourth PDU, in response to the third PDU.

2. The IC of claim 1, further comprising:
circuitry configured to transmit a modulated signal in accordance with an intentional injection of noise and perform a time-based position measurement in accordance with the modulated signal.

3. The IC of claim 1, wherein the first PDU and the second PDU employ a same type of modulation.

4. The IC of claim 2, wherein the modulated signal is transmitted on a different frequency than the first PDU.

5. The IC of claim 1, wherein the IC includes digital signal processor (DSP) circuitry, wherein the second PDU comprises a single identifier which is both correlated with a unique identifier and which is correlated with shared key data.

6. The IC of claim 1, wherein the second PDU is transmitted using a different type of modulation than the third PDU;
wherein the second PDU indicates information for tracking purposes.

7. The IC of claim 1, wherein the second set of flags indicate that the second header portion lacks a synchronization information field and an address field.

8. The IC of claim 1, wherein the second header portion comprises fewer parameters than the header portion.

9. The IC of claim 2, wherein the time-based position measurement is performed in accordance with the capability check.

10. The IC of claim 2, wherein the modulated signal includes more noise than the second PDU.

11. The IC of claim 1, further comprising:
circuitry configured to transmit another frame space value different than the frame space value, wherein the address is associated with the another device.

12. The IC of claim 2, wherein the injecting of the noise into the modulated signal is to thwart a potential adversary, wherein the another device is a non-access point device.

13. The IC of claim 2, wherein the modulated signal is a component of a frame having a variable length frame format which always comprises a header portion and a fixed length trailer portion.

14. The IC of claim 2, wherein the time-based position measurement is performed on one or more frequencies of an unlicensed band.

15. The IC of claim 14, wherein the one or more frequencies occupy Bluetooth transmissions;

wherein the IC transmits at least one PDU indicative of a type of emergency, wherein emergency types include smoke detection emergency, vehicle emergency and hazardous gas emergency.

16. An integrated circuit (IC) comprising:
circuitry configured to perform at least one capability check procedure with another device, the capability check procedure comprising at least a wireless transmission of a single coded capability identifier representative of a plurality of supported features, wherein the plurality of supported features include at least encryption support and modulation support;

circuitry configured to operate in at least one of a plurality of operating modes that support measurement taking, wherein the circuitry configured to operate is configured in accordance with the single coded capability identifier, wherein the plurality of operating modes comprise a first operating mode and a second operating mode;

wherein, in the first operating mode:
the IC provides a first modulated signal for transmission to the another device in an unlicensed band, wherein the first modulated signal has a first preamble portion associated with one of a first modulation scheme or a second alternative modulation scheme;

wherein, in the second operating mode:
the IC provides a second modulated signal for transmission to the another device in the unlicensed band, wherein the second modulated signal includes an intentional injection of noise such that the second modulated signal includes more noise than the first modulated signal, wherein the second modulated signal has a preamble portion associated with either the first modulation scheme or the second alternative modulation scheme.

17. The IC of claim 16, further comprising:
circuitry configured to formulate a code on demand, based on certain trigger criteria and a timer, wherein the code includes a portion derived from a random number and the code identifies the device;
wherein the IC is configured to process one or more PDUs based on the formulated code.

18. The IC of claim 16, wherein the first modulated signal and the second modulated signal are transmitted on different channels.

19. The IC of claim 16, wherein one of the first modulation scheme or the second modulation scheme is phase shift keying.

20. An integrated circuit (IC) comprising:
circuitry configured to process a first protocol data unit (PDU) having a first header portion comprising a first set of flags that specify whether the first header portion includes clock information, synchronization information and an address;

circuitry configured to process a second PDU having a second header portion and encryption information, wherein the second header portion comprises a second set of flags which are configured differently than the first set of flags;

circuitry configured to process data, based on the encryption information;

circuitry configured to perform at least one capability check with another device, wherein a coded capability identifier representative of a plurality of supported features is processed by the IC, wherein the coded capability identifier indicates at least support for a frame space timing capability;

circuitry configured to process a third PDU, in accordance with the capability check, wherein the third PDU specifies a frame space value, a type value and a physical layer (PHY) parameter, wherein the PHY parameter is different from a PHY parameter employed by the first PDU and a PHY parameter employed by the second PDU;

circuitry configured to process a fourth PDU, in response to the third PDU.

* * * * *